(12) United States Patent
Sutton et al.

(10) Patent No.: US 10,841,890 B2
(45) Date of Patent: Nov. 17, 2020

(54) DELAY TOLERANT NODE

(71) Applicant: SRS Space Limited, Cork (IE)

(72) Inventors: Paul D. Sutton, Cork (IE); Ismael Gomez Miguelez, Barcelona (ES); Justin C. Tallon, Barcelona (ES)

(73) Assignee: SRS Space Limited, Cork (IE)

( * ) Notice: Subject to any disclaimer, the term of this patent is extended or adjusted under 35 U.S.C. 154(b) by 0 days.

(21) Appl. No.: 16/379,399

(22) Filed: Apr. 9, 2019

(65) Prior Publication Data

US 2020/0154383 A1    May 14, 2020

Related U.S. Application Data (60) Provisional application No. 62/758,217, filed on Nov. 9, 2018.

(51) Int. Cl.
| | |
|---|---|
| H04W 56/00 | (2009.01) |
| H04W 76/18 | (2018.01) |
| H04L 1/16 | (2006.01) |
| H04L 1/18 | (2006.01) |
| H04L 5/00 | (2006.01) |
| H04W 74/08 | (2009.01) |

(52) U.S. Cl.
CPC .......... *H04W 56/003* (2013.01); *H04L 1/1664* (2013.01); *H04L 1/1812* (2013.01); *H04L 5/0055* (2013.01); *H04W 74/0833* (2013.01); *H04W 76/18* (2018.02)

(58) Field of Classification Search
CPC ........... H04W 56/003; H04W 74/0833; H04W 76/18; H04L 5/0055; H04L 1/1664; H04L 1/1812

USPC .......................................................... 714/748
See application file for complete search history.

(56) References Cited

U.S. PATENT DOCUMENTS

| | | | |
|---|---|---|---|
| 9,973,266 B1 | 5/2018 | Avellan et al. | |
| 10,057,015 B1* | 8/2018 | Naim | ........................ H04L 1/08 |
| 10,084,535 B1 | 9/2018 | Speidel et al. | |
| 2005/0060426 A1 | 3/2005 | Samuels et al. | |
| 2006/0215617 A1* | 9/2006 | Martin | .................. H04B 7/212 370/337 |
| 2009/0163217 A1* | 6/2009 | Xu | ........................ H04W 76/10 455/450 |

(Continued)

FOREIGN PATENT DOCUMENTS

WO    WO-2018/222235 A9    12/2018

OTHER PUBLICATIONS

L. Djeddai, et al., "IPSecOPEP: IPSec Over PEPs Architecture, for Secure and Optimized Communications Over Satellite Links", 2016 7th IEEE international Conference on Software Engineering and Service Science (ICSESS), IEEE, Aug. 26, 2016, pp. 264-268.

(Continued)

*Primary Examiner* — James C Kerveros
(74) *Attorney, Agent, or Firm* — Blank Rome LLP (57) ABSTRACT

A Long-Term Evolution (LTE) E-UTRAN Node B (eNodeB) for use in satellite markets. The LTE eNodeB supports extreme channel latencies without the need for any User Equipment (UE) (e.g., mobile handsets) modifications, independent of the UE release or the technology used by the network operator. The system supports high channel latencies in LTE, though can also be used for other wireless technologies such as GSM, 5G New Radio (NR) or any other technologies with similar procedures to those used in LTE.

27 Claims, 5 Drawing Sheets

(56) References Cited

U.S. PATENT DOCUMENTS

| | | | | | |
|---|---|---|---|---|---|
| 2010/0257423 | A1* | 10/2010 | Kim | .......................... | H04L 1/16 |
| | | | | | 714/749 |
| 2014/0044082 | A1* | 2/2014 | Iwamura | ............... | H04L 1/1812 |
| | | | | | 370/329 |
| 2014/0126553 | A1* | 5/2014 | Li | ........................ | H04L 5/0055 |
| | | | | | 370/336 |
| 2015/0092645 | A1* | 4/2015 | Tabet | .................... | H04L 1/1825 |
| | | | | | 370/311 |
| 2015/0124782 | A1* | 5/2015 | Bachu | .................. | H04L 1/1816 |
| | | | | | 370/336 |
| 2015/0222394 | A1* | 8/2015 | Cheng | ..................... | H04L 5/001 |
| | | | | | 370/280 |
| 2018/0278374 | A1* | 9/2018 | Zeng | ..................... | H04L 1/1822 |
| 2018/0302193 | A1* | 10/2018 | Akkarakaran | ......... | H04L 1/1887 |
| 2018/0367262 | A1* | 12/2018 | Hwang | ................. | H04L 1/1825 |
| 2018/0367263 | A1* | 12/2018 | Ying | ................. | H04W 72/1273 |
| 2018/0376498 | A1* | 12/2018 | Bhattad | ............. | H04W 72/1294 |
| 2019/0150140 | A1* | 5/2019 | Patel | ......................... | H04L 1/08 |
| | | | | | 370/336 |
| 2019/0230647 | A1* | 7/2019 | Yang | ......................... | H04L 5/00 |

OTHER PUBLICATIONS

Ericsson, "On Adapting HARQ Procedures for NTN", 3GPP Draft; R1-1813366 on Adapting HARQ Procedures for NTN, 3rd Generation Partnership Project (3GPP), vol. RAN WG1, Nov. 3, 2018, 4 pgs.

European Search Report for EP Application No. EP19172570, dated Nov. 5, 2019, 9 pgs.

* cited by examiner

DELAY TOLERANT NODE

RELATED APPLICATIONS

This application claims the benefit of U.S. Provisional Application No. 62/758,217, filed Nov. 9, 2018, the entire contents of which are incorporated herein by reference.

BACKGROUND OF THE INVENTION

Field of the Invention

The present invention provides the design and implementation of a delay tolerant eNodeB, which is a Long-Term Evolution (LTE) base station.

BACKGROUND OF THE RELATED ART

Wireless terminal stations such as smartphones connect to base stations through a Radio Access Network (RAN). RAN technology has evolved through a number of generations and each technology is broadly referred to by its generation number. For example, GSM (Global System for Mobile Communications) technology is a 2G RAN, UMTS (Universal Mobile Telecommunications System) is a 3G RAN, LTE-A (Long-Term Evolution Advanced) is a 4G RAN and 5GNR (New Radio) is a 5G RAN. LTE-A is also referred to as E-UTRAN (Evolved Universal Terrestrial Radio Access Network) and is referred to simply as "LTE" herein.

Each generation of RAN technology defines a set of communication protocols used to transfer information back and forth between the terminal station and base station. The key functions of these protocols are generally separated into layers of a network stack at both the terminal station and base station. Taking LTE as an example, the lowest layer of the stack is the Physical (PHY) layer. The PHY layer carries all information from transport channels over the air interface. Above the PHY is the Medium Access Control (MAC) layer. The MAC layer performs data multiplexing, scheduling and error correction and retransmission. The scheduler is a key component of the MAC layer at the base station, responsible for managing when and how information is transferred to and from different terminal stations. Above the MAC layer is the Radio Link Control (RLC) layer. The RLC layer is responsible for concatenation, segmentation and reassembly of data packets as well as reordering, duplicate detection and retransmission. Above the RLC is the Packet Data Convergence Protocol (PDCP). The PDCP layer is responsible for ciphering, deciphering, integrity protection and validation of traffic as well as in-sequence packet delivery to higher layers. The Radio Resource Control (RRC) layer sits above the PDCP and is responsible for control signaling including broadcast of system information and establishment, maintenance and release of the wireless connection between the terminal station and the base station. Beside the RRC layer is the Internet Protocol (IP) layer, which relays internet data traffic as datagrams. On the wireless terminal, the Non-Access Stratum (NAS) layer also sits above the RRC layer, managing the connection between the terminal station and the core network and performing authentication and authorization functions.

In an LTE network, the base station is referred to as an evolved Node B (eNodeB or eNB) and the terminal station is referred to as the User Equipment (UE).

Figure 1A:
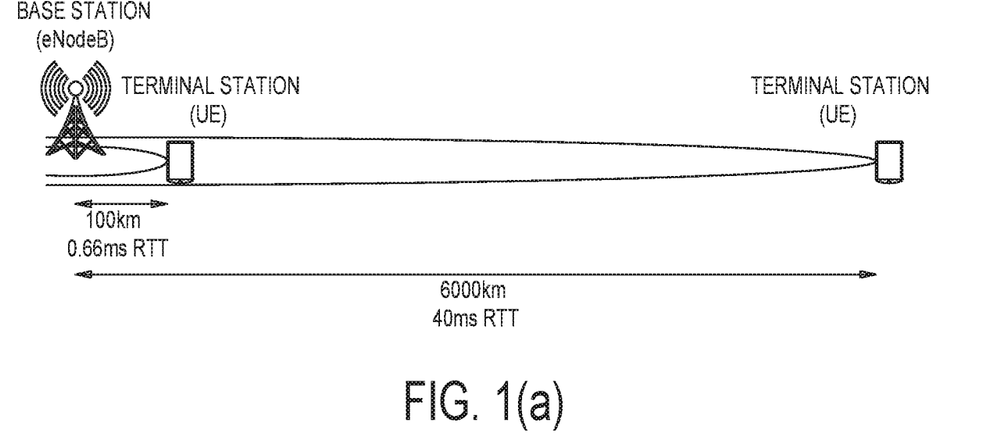
FIG. 1(a) shows delay in an LTE network.
Figure 1B:
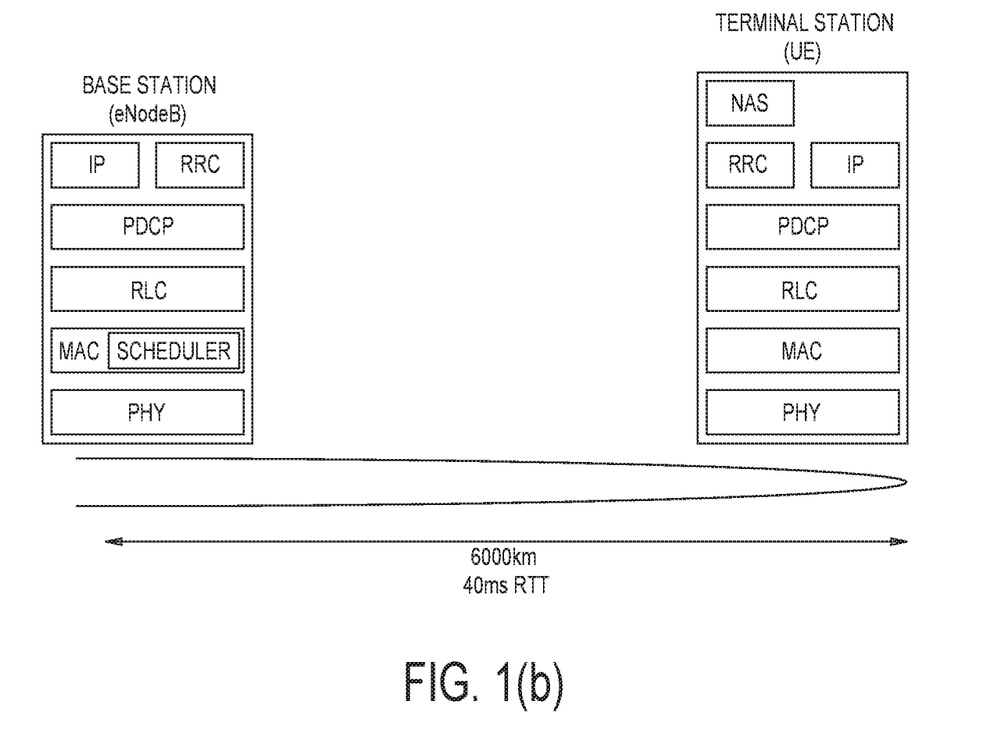
FIG. 1(b) shows protocol stacks showing e.g. MAC layer and scheduler.

As shown in FIGS. 1(a), 1(b), in normal LTE networks, there is a maximum distance between eNodeB and UE of approximately 100 km. Given this, the LTE standard has been designed with a Round-Trip Time (RTT) between the eNodeB=and the UE (e.g., a mobile handset and here especially an LTE handset), that is less than 0.66 ms. FIG. 1(b) also shows the base station having a protocol stack that includes a scheduler (FIG. 1(b)), and the terminal station having a MAC layer.

If LTE technology is used in networks where the distance between the eNodeB and the UE is greater than 100 km, the RTT or roundtrip delay may significantly exceed 0.66 ms. For systems with a distance of 6000 km, as further illustrated in FIG. 1(a) for example, the roundtrip delay will be up to 40 ms, more than 50 times the maximum delay expected by LTE technology. The constraint of having one side of this eNodeB-UE pair being blind to this added delay causes communication breakdown.

The initial technical challenges of that communication breakdown include Hybrid Automatic Repeat reQuest (HARQ), Random Access Procedure, Uplink Time Synchronization, and Handover Procedure. HARQ is used in the Medium Access Control (MAC) layer, FIG. 1(b), of the LTE protocol stack. See Farooq Khan "LTE for 4G Mobile Broadband: Air Interface Technologies and Performance" Cambridge University Press 2009. HARQ is a retransmission and error correction protocol that employs the use of (negative)/acknowledgement messages between a sender and receiver. It is used to both detect and rectify the failure of a packet transmission. The sender will keep a copy of the message that it has just sent for a specified time period until its success or failure has been confirmed or it has timed out. In LTE, the time period in which an acknowledgement is expected is 4 ms. This time restriction is obviously a challenge for an LTE system where a Round-Trip Time (RTT) of more than 4 ms is expected, such that connection would not be possible.

In LTE, the Random Access Procedure begins with the UE transmitting a PRACH (Physical Random Access CHannel) message to the eNodeB. The Random Access Procedure is used every time the UE creates a radio link with the network. In LTE networks, the radio link is broken if there is no data to transmit and recreated when data becomes available to transmit. For this reason, the Random Access Procedure is used very frequently, even during a single data session. The Random Access Procedure is also the first step of the Attach Procedure, used when the UE connects to the network for the first time, following power-on or upon entering network coverage. Once this message has been received, the eNodeB has a specified amount time to respond with a Random Access Response message. This time period is configurable but the maximum allowable time is 10 ms which is shorter for example than the 40 ms example outlined above, such that connection would not be possible.

With regard to Uplink Time Synchronization, in an LTE system when a UE connects to the eNodeB, the eNodeB instructs that UE to adjust the timing of its transmissions using the Random Access Response (RAR) message. This is done to ensure that transmissions from all UEs are received in-sync at the eNodeB. But this approach cannot be used in the example outlined above where the RTT exceeds the maximum allowable 10 ms response time. In this case, the timing offset cannot be known at the eNodeB before the RAR message must be sent, the eNodeB cannot instruct the UE to adjust the timing of its transmissions and connection cannot be possible.

The Handover Procedure presents a similar challenge to that of the Random Access Procedure where the UE transmits a PRACH message and the eNodeB responds with a Random Access Response (RAR). The Handover Procedure takes place when the UE moves from one eNodeB coverage area to another eNodeB coverage area, disconnecting from the first eNodeB and connecting to the second eNodeB. If the RTT exceeds the maximum 10 ms delay for the Random Access Response, connection will not be possible and the call will drop during handover. The difference between the regular Random Access Procedure and the Handover Procedure is that the UE is already known by the eNodeB and alternative approaches can be leveraged to solve the problem.

It is therefore one objective of the invention to provide a system that ensures reliable connection during HARQ, Random Access Procedure, and Uplink Synchronization, and that also prevents call drop during Handover Procedures.

If LTE technology is used in networks where the distance between the base station and the terminal station is greater than 100 km and where either the base station or the terminal station is moving at high speed in relation to the other, additional techniques are required to compensate for changing Doppler frequency shift and changing time delays. This is the case for example, where either the base station or terminal station are in Low-Earth Orbit and the other is on the Earth's surface. For this scenario, such additional techniques are described in U.S. Pat. No. 9,973,266 B1.

SUMMARY OF THE INVENTION

The present invention provides a Long-Term Evolution (LTE) E-UTRAN Node B (eNodeB) for use in satellite markets. The LTE eNodeB supports extreme channel latencies without the need for any User Equipment (UE) (e.g., mobile handsets) modifications, independent of the UE release or the technology used by the network operator. The invention supports high channel latencies in LTE, though can also be used for other wireless technologies such as GSM, 5G New Radio (NR) or any other technologies with similar procedures to those used in LTE.

These and other objects of the invention, as well as many of the intended advantages thereof, will become more readily apparent when reference is made to the following description, taken in conjunction with the accompanying drawings.

DETAILED DESCRIPTION OF THE EMBODIMENTS

In describing the illustrative, non-limiting embodiments of the invention illustrated in the drawings, specific terminology will be resorted to for the sake of clarity. However, the invention is not intended to be limited to the specific terms so selected, and it is to be understood that each specific term includes all technical equivalents that operate in similar manner to accomplish a similar purpose. Several embodiments of the invention are described for illustrative purposes, it being understood that the invention may be embodied in other forms not specifically shown in the drawings.

In accordance with the invention, a system is provided having a signal delay tolerant base station that communicates with UE. In one embodiment, the system is an LTE system, the base station is an eNodeB base station (sometimes referred to only as "eNodeB" below), and the UE is an LTE mobile handset such as a cellular phone, smart phone or USB dongle. The eNodeB includes a processing device that among other things controls operation of the eNodeB and communication of signals to and from the UE.

Figure 2A:
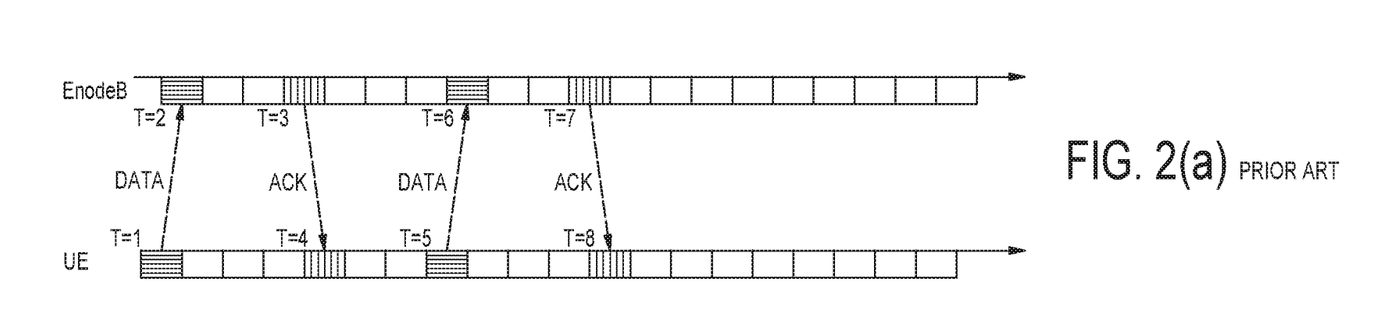
FIG. 2(a) shows normal HARQ operation.
Figure 2B:
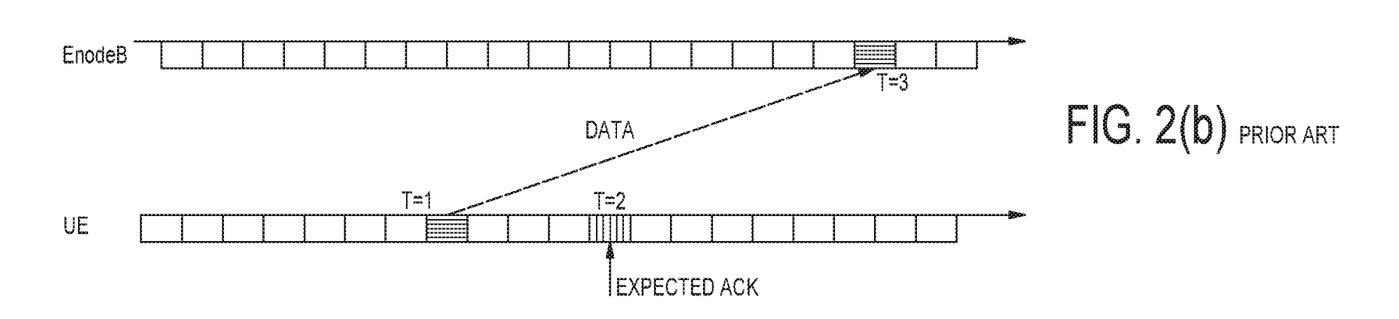
FIG. 2(b) shows HARQ operation failure due to high RTT.
Figure 2C:
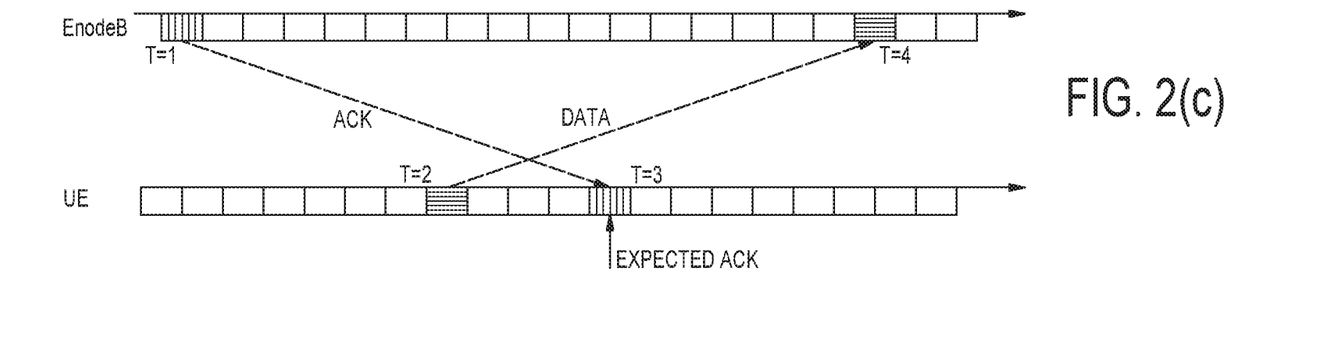
FIG. 2(c) shows HARQ operation success with dummy ACK.

HARQ (FIG. 2)

As noted above, the Hybrid Automatic Repeat reQuest (HARQ) is a retransmission and error correction protocol. A normal HARQ operation is shown, for example, in FIG. 2(a) where there are normal expected communication delays. Starting at T=1, the UE sends a data signal to the eNodeB, which receives that data signal at T=2. At T=3, the eNodeB sends an acknowledgement message (ACK) signal to the UE, which receives the ACK at T=4. The UE expects to receive the ACK signal from the eNodeB so that the UE knows that the data signal was successfully transmitted to and received by the eNodeB. The UE expects to receive that ACK at an expected predetermined point in time. For an LTE system, that expected predetermined time period is 4 ms, which includes the expected maximum 0.66 ms for the data signal to be transmitted from the UE to the eNodeB, the time for the eNodeB to process the data signal at T=2 and send the ACK at T=3, and the expected 0.66 ms for the ACK to be transmitted from the eNodeB to the UE. If T=4 is at that predetermined point in time, then the system operates without interruption, and the UE can continue to send data signals to the eNodeB, which acknowledges that it received the data signals by sending a respective ACK signal to the UE, as illustrated at T=5 to T=8.

FIG. 2(b) illustrates how a communication problem arises with HARQ when there is an excessive delay (e.g., over 0.66 ms RTT) in the communication between the UE and the eNodeB. Here, the UE sends a data signal at T=1, but the signal is delayed and the eNodeB does not receive that data signal at T=3. Meanwhile, the UE expected to receive an ACK from the eNodeB at T=2, which can be before the eNodeB receives the data signal at T=3. So here the communication fails because the UE did not receive the ACK within the expected predetermined time period. At T=2, if the UE doesn't receive an ACK, it will attempt to retransmit the data. If it still does not receive an ACK after several retransmission attempts, it will then send a Radio Link Failure (RLF) and will attempt to re-establish the connection.

FIG. 2(c) illustrates a solution to the HARQ timing requirement in accordance with one embodiment of the invention. Here, the eNodeB pre-acknowledges all packets in either direction. In the downlink, the eNodeB assumes that the packet is successfully received, acting as though a positive acknowledgement message (ACK) has been received from the UE. For uplink data transmissions from UE to eNodeB, the eNodeB will acknowledge every UE message that has been scheduled automatically without having actually received them yet. The UE message is scheduled by the scheduler (FIG. 1(b)), or pre-scheduled, since every message that is sent by the UE is done so as a result of a grant given by the eNodeB, meaning the eNodeB knows the time at which the UE sends any message. Using this knowledge, the eNodeB can time the sending of the acknowledgment such that the ACK arrives in the slot that the UE expects it—for example, the UE will expect the acknowledgment of the message in the control channel, 4 ms after sending the message.

Referring to FIG. 2(c), an example is shown where at T=1, the eNodeB transmits a positive acknowledgement message (ACK) to the UE. That ACK is transmitted before the eNodeB receives any data signal from the UE and perhaps even before the UE transmits any data signal. At T=2, the UE transmits the data signal, and at T=3 the UE receives the ACK from the eNodeB. At T=4, the eNodeB receives the data signal from the UE following a substantial delay that is greater than the expected predetermined time period. Yet, the UE receives the ACK (at T=3) within the expected predetermined time period, even despite the large delay from when the UE transmits a data signal at T=2 and when it is received at the eNodeB at T=4. And at T=4, the eNodeB need not send an actual ACK signal since it already sent the ACK to acknowledge receipt of the data signal, so the cycle is complete.

Thus, the HARQ protocol of the present invention will operate during excessive periods of delay in communication between the UE and the eNodeB, regardless of whether that delay occurs during the transmission from the UE to the eNodeB or during the transmission from the eNodeB to the UE. In addition, the HARQ protocol operates during normal conditions when there are no excessive periods of delay. And, this protocol is completely implemented at the eNodeB. The UE can operate as normal and no change is needed to the UE.

It is noted that the LTE system is a master-slave system, so that a UE only sends data when the eNodeB has given it permission to do so. Accordingly, the eNodeB knows when any given UE is due to transmit some data. Based on that information, it can send the ACK message, and the eNodeB need only send a single ACK message. The ACK message does not need to explicitly identify the data to which it refers. The LTE specifies that the ACK should be received 4 ms after the data is transmitted, so that every ACK is linked to a specific data transmission.

It is noted that a certain number of messages might not be successfully received by the eNodeB, but will still be positively acknowledged by the eNodeB and received by the UE. Here, it is further noted that the LTE standard includes two acknowledge/repeat mechanisms. The HARQ mechanism provides a fast-retransmission mechanism. The separate, higher-layer Radio Link Control (RLC) (from the RLC in the base station shown in FIG. 1(b)) provides a second slower-retransmission mechanism. For messages which are not successfully received by the HARQ process, the higher Radio Link Control (RLC) layer retransmission mechanism fixes any remaining errors or missed transmissions. In the case where the message reception fails at the HARQ, the receiver continues to onto the next packet. At the RLC layer (from the RLC shown in FIG. 1(b)), the ARQ mechanism here will notice the missing packet in the sequence and send a NACK (Non-Acknowledgement) to the sender. This message will be passed to the RLC layer at the sender where the message has been stored in anticipation for an ACK/NACK. Once the NACK has been received at the UE, the UE will resend this message. This process is repeated in both directions.

Figure 3A:
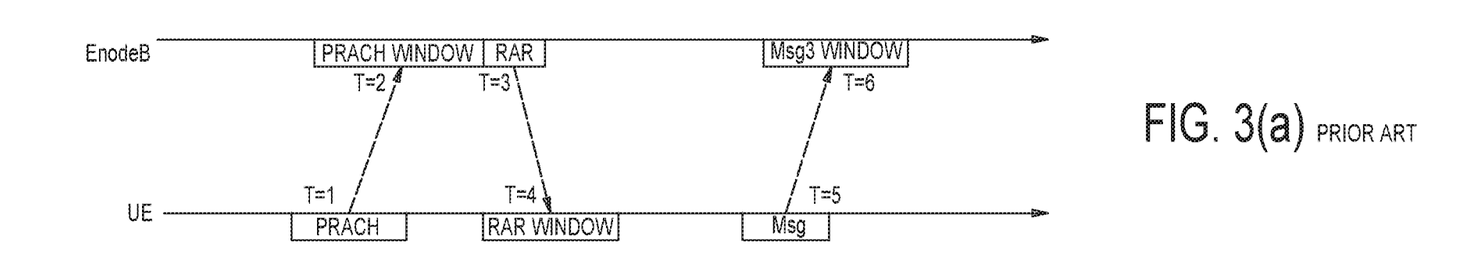
FIG. 3(a) shows normal RA procedure without a significant delay.
Figure 3B:
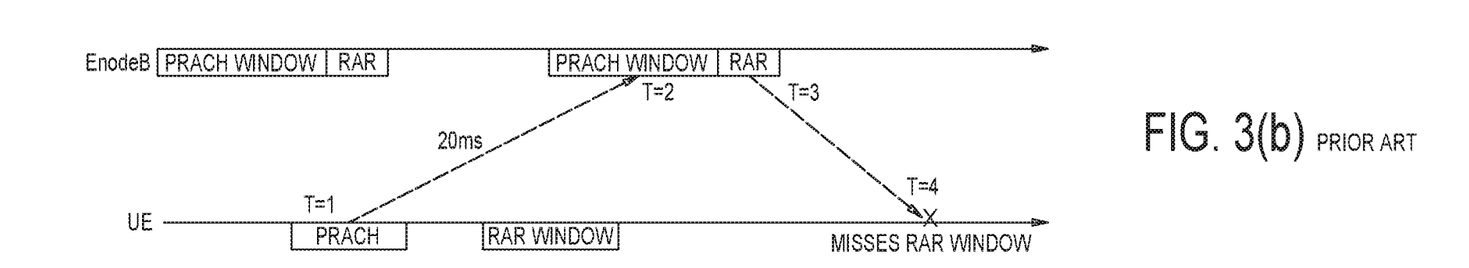
FIG. 3(b) shows 40 ms round trip delay and failed RA procedure.
Figure 3C:
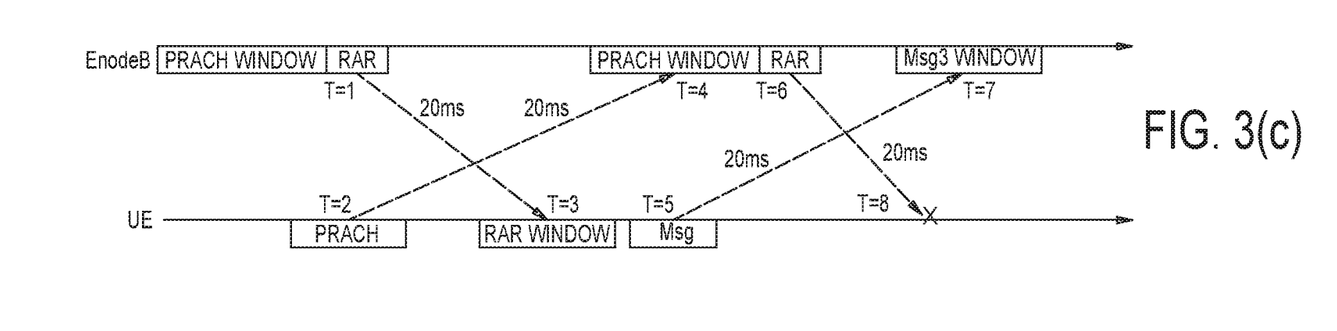
FIG. 3(c) shows an RA procedure in accordance with the invention with continuously transmitted RAR messages.

Random Access Procedure (FIG. 3)

Referring to FIG. 3(a), the Random Access (RA) Procedure is illustrated under normal operation without excessive communication delay. At T=1, the UE transmits a Physical Random Access CHannel (PRACH) message to the eNodeB. The PRACH message is sent over a PRACH channel for the UE to communicate that initial PRACH message to the eNodeB and for the UE synchronize with the eNodeB. The eNodeB allocates a specific timeslot during which UEs can transmit PRACH messages (i.e., the PRACH window). Here, the eNodeB receives that PRACH message at T=2, which is within the expected PRACH window, as shown.

In response to receiving the PRACH message, the eNodeB at T=3 then transmits a Random Access Response (RAR). The RAR is expected at the UE during another specific timeslot (i.e., the RAR window), which is configurable but the maximum allowable time is 10 ms. At T=4 the UE receives the PRACH message during the expected RAR window. Accordingly, the Random Access Procedure is successful and the UE can proceed to send Msg3 RRC Connection Request at T=5, which is received by the eNodeB at a defined Msg3 timeslot at T=6, and connection is established (i.e., the RRC connection request done by the RRC (FIG. 1(b)) in the base station. It is noted that before the Random Access Procedure, the UE isn't synchronized with the eNodeB, so windows are used and the UE aims to transmit such that messages are received within the window. After Random Access Procedure, the UE is synchronized and all messages are expected to be received at specified times.

Turning to FIG. 3(b), the RA procedure is shown to fail where there is an excessive delay in the Round-Trip Time (RTT) for transmission of the PRACH from the UE at T=1 to the eNodeB at T=2, and of the RAR from the eNodeB at T=3 to the UE at T=4. Here, that delay is shown to be 40 ms (20 ms for the PRACH to be received and 20 ms for the eNodeB to generate the RAR and for the RAR to be received at the UE). Consequently, the RAR is not received by the UE during the RAR window, but is instead received much later at T=4, so that the Msg3 is never sent by the UE. That is, the high Round-Trip Time (RTT) means that the PRACH message sent by the UE is not received in the intended timeslot (PRACH window) at the eNodeB and the eNodeB cannot respond with the RAR message within the required 10 ms deadline (RAR window). When a significant delay is introduced into the channel, the RAR misses the RAR window and the Random Access Procedure fails at this point and the UE fails to connect with the eNodeB.

FIG. 3(c) shows a Random Access Procedure in accordance with one embodiment of the invention. The attach procedure typically begins with the UE transmitting a contention-based PRACH message to the eNodeB. This Random Access (RA) step is the first part of the attach procedure. The eNodeB ensures that PRACH messages transmitted by the UE will be received within a PRACH window. This is done by carefully scheduling PRACH windows to account for the known transmission delay. That is, the eNodeB scheduler (FIG. 1(b)) schedules (i.e., pre-schedules) the PRACH windows before the transmission begins. Accordingly, the invention requires the eNodeB to have knowledge of the expected transmission delay, which can be fixed to a known value.

In addition, the eNodeB continuously transmits Random Access Response (RAR) messages to the UE. For example, in one embodiment, the eNodeB transmits RAR response messages proactively at every opportunity. The eNodeB transmits an RAR for every possible preamble index, in every frame. This means that when a UE sends a PRACH message to the eNodeB, the UE is guaranteed to receive one of these RAR messages within the 10 ms deadline and the UE will be able to continue the Random Access Procedure as normal.

Accordingly, referring to FIG. 3(c), the eNodeB scheduler (FIG. 1(b)) schedules PRACH windows at various predetermined intervals (i.e., the windows are pre-scheduled prior to the RAR transmission), and at T=1 the eNodeB transmits an RAR to the UE. It is noted that the eNodeB doesn't know about the UE, it simply sends RAR messages blindly in every allocated timeslot. This guarantees that a UE will receive an RAR if it "listens" for one. At T=2, the UE generates the PRACH and sends it to the eNodeB. At T=3, the UE receives the RAR from the eNodeB, even though the eNodeB has not yet received the PRACH message, which occurs at T=4.

Then at T=5, the UE can send the Msg3, which might occur before the eNodeB sends an RAR at T=6. PRACH windows are allocated regularly at predetermined intervals at the eNodeB. RAR messages are transmitted by the eNodeB within a specified time of receiving a PRACH. Upon receiving a PRACH transmission from a UE, the eNodeB scheduler (FIG. 1(b)) schedules timeslots in which to receive the Msg3 transmission from that UE. Thus, the eNodeB successfully receives the Msg3 at T=7, which can be before the RAR is received at T=8. At this point, however, the UE isn't listening for a RAR, so it doesn't take any action. The eNodeB sends RAR messages blindly at every opportunity, including at T=6, even though it already sent one at TI. It does not matter if there is a UE listening for the RAR at this point.

Thus, the Random Access Procedure protocol of the present invention will operate during excessive periods of delay in communication between the UE and the eNodeB, regardless of whether that delay occurs during the transmission from the UE to the eNodeB or during the transmission from the eNodeB to the UE. In addition, the Random Access Procedure operates during normal conditions when there is no excessive periods of delay. And, this protocol is completely implemented at the eNodeB. The UE can operate as normal and no change is needed to the UE.

The contention-based Random Access used in LTE means that a UE can select one of N PRACH messages to transmit to the eNodeB. The eNodeB must transmit a RAR message containing an element (a Random Access Preamble IDentifier RAPID) which corresponds to the received PRACH message. RAR messages can contain multiple RAPIDs.

The eNodeB determines when PRACH windows occur as defined by the LTE standard. RARs are transmitted following every PRACH window.

For the present invention, if N preambles are configured for contention-based Random Access, the eNodeB will transmit one (1) RAR message within every window associated with every PRACH opportunity. Each message will contain N RAPIDs, one for each possible PRACH message (0 to N−1).

Figure 4A:
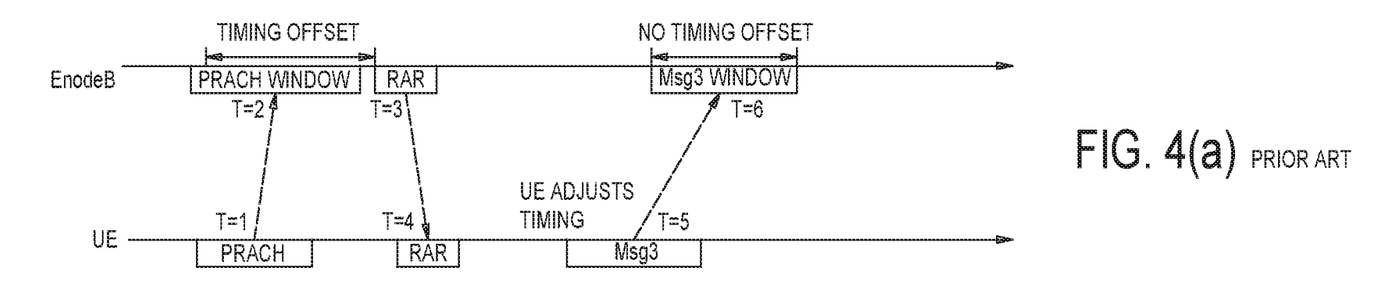
FIG. 4(a) shows normal timing advance operation using RAR.
Figure 4B:
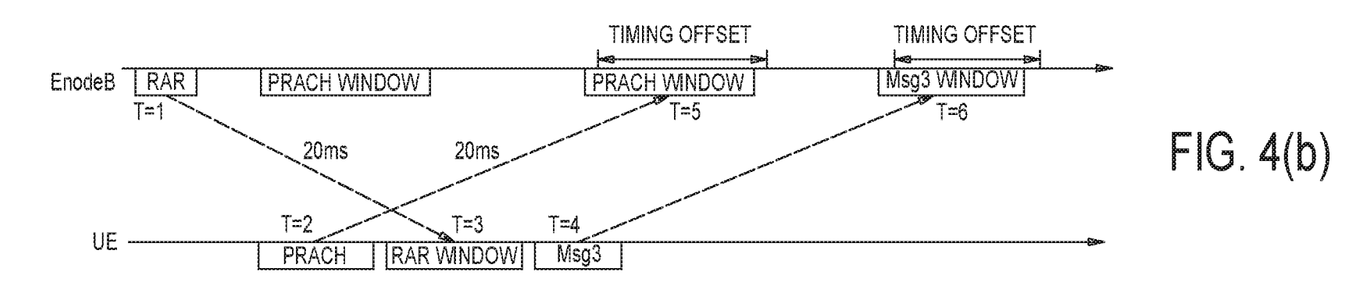
FIG. 4(b) shows timing advance operation is impossible with high RTT.
Figure 4C:
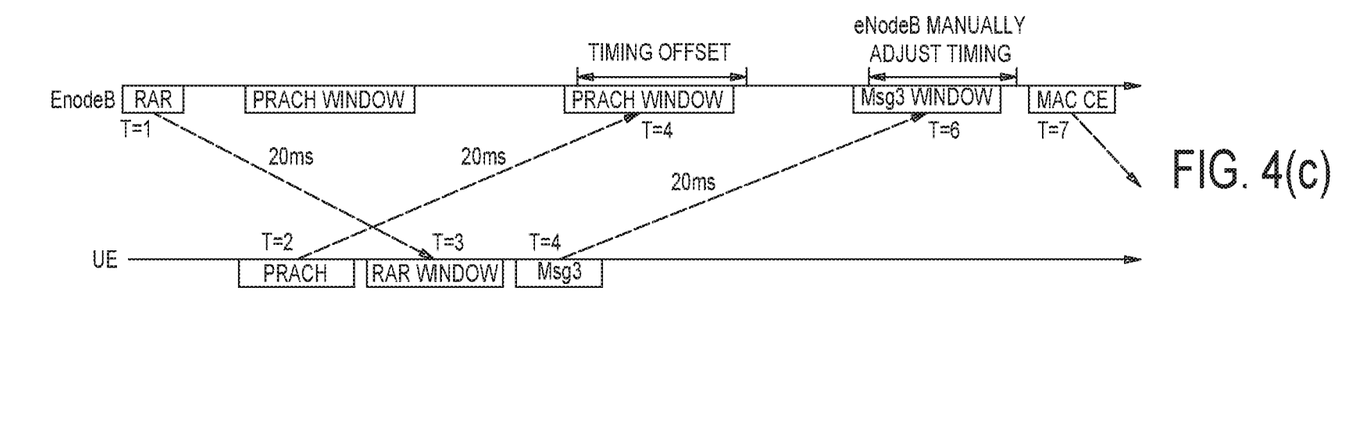
FIG. 4(c) shows timing of the invention using MAC control element (CE)

Uplink Time Synchronization (FIG. 4)

The challenge of uplink (i.e., transmissions from the UE to the eNodeB) time synchronization arises in part because of the previous challenge of the Random Access Procedure and the solution adopted. As the eNodeB proactively sends RAR messages on a continual basis without actually having received the PRACH message from the UE, it sends the RAR without knowledge of the timing offset of that UE. Referring to FIG. 4(a), in a normal system within expected communication delays, the PRACH is sent at T=1 and received at T=2. The eNodeB receives the PRACH within a defined PRACH window. The position of the PRACH within the window is used by the eNodeB to estimate the time offset of the UE. At T=3, the eNodeB then sends the RAR message, which includes an instruction to the UE to correct its timing. The UE receives the RAR message with the timing correction at T=4. Accordingly, when the UE sends the Msg3 at T=5, it corrects the timing of that signal so that the Msg3 does not contain any timing offset when it is received at the eNodeB at T=6.

However, under the Random Access Procedure protocol of the current invention, as shown in FIG. 4(b) (which is similar to FIG. 3(c)), there is no opportunity for the eNodeB to send a timing correction to the UE. The RAR is sent at T=1, which is prior to receiving the PRACH from the UE at T=5, so the RAR cannot contain a timing correction. Thus, the Timing Advance (TA) value given by the eNodeB to the UE in the RAR at T=1 will be 0 and so the next uplink message sent by the UE at T=4 will not be time aligned.

The eNodeB is first notified to the presence of a UE attempting to attach by the reception of the PRACH message. From this message the eNodeB can determine the timing offset of the UE. Since in our case, the RAR message has already been sent and received by this point, the eNodeB prepares for the reception of the RRC connection request, also known as Msg3. However, this Msg3 will not be time aligned.

Given this, the eNodeB reserves space to allow for the maximum timing offset and must compensate the timing of incoming messages until the timing can be corrected at the UE. Thus, a method of correcting the timing at the UE without using the initial RAR message is provided. More specifically, the eNodeB carefully schedules the transmissions of other UEs to avoid interfering with the expected Msg3 from the non-time-aligned UE performing the attach procedure. As the LTE is a master-slave system, the eNodeB has full control over the network. It ensures that other UEs do not communicate at this time in a way that would interfere with the Msg3 from this UE. By the time the Msg3 is received by the eNodeB at T6, the eNodeB has received the PRACH message and can calculate the timing offset of that UE. With this knowledge of the timing offset, the eNodeB can receive a window containing the Msg3 and extract the Msg3 at the correct offset within the window.

The Msg3 timing correction method serves as an effective temporary solution to correct for UE timing offset at the eNodeB. However, it cannot be used on an ongoing basis so a method of instructing the UE to adjust timing is needed. Two other mechanisms exist within the LTE standard for an eNodeB to instruct the UE in this way. The first is the Timing Advance Command, a MAC layer control element (FIG. 1(b)), as shown in FIG. 4(c). The second mechanism is a Physical Downlink Control CHannel (PDCCH) order which is a DCI Format 1A with special fields. This message instructs the UE to send another PRACH message and to listen for an RAR message in response. The RAR message can be used by the eNodeB to instruct the UE to adjust its transmission timing with a TA offset. The first mechanism can be used by the eNodeB to instruct the UE to make small time offset adjustments (less than 15 micro seconds). The second mechanism can be used by the eNodeB to instruct the UE to make large time offset adjustments. The eNodeB dynamically selects one of these two mechanisms according to the size of the timing offset which must be adjusted.

Thus, the Uplink Time Synchronization protocol of the present invention will operate during excessive periods of delay in communication between the UE and the eNodeB, regardless of whether that delay occurs during the transmission from the UE to the eNodeB or during the transmission from the eNodeB to the UE. In addition, the protocol operates during normal conditions when there is no excessive periods of delay. And, this protocol is completely implemented at the eNodeB. The UE can operate as normal and no change is needed to the UE.

Figure 5A:
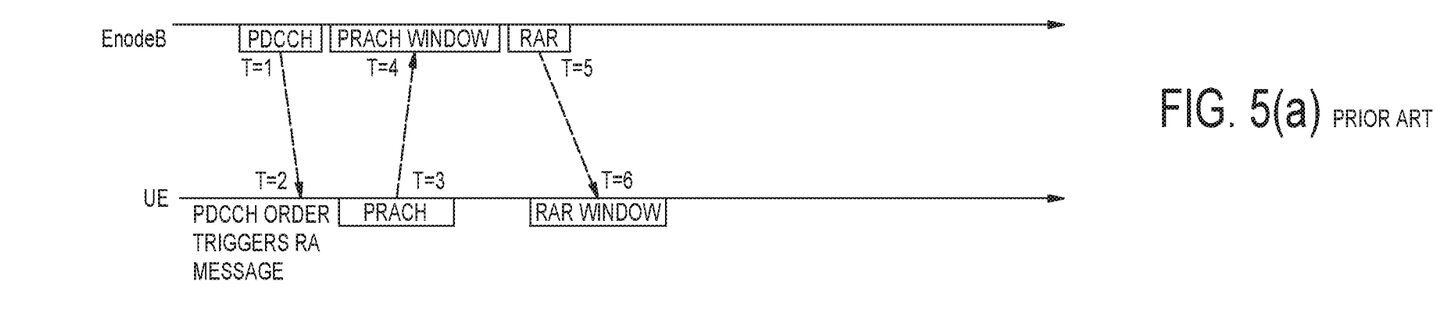
FIG. 5(a) shows normal contention free handover procedure.
Figure 5B:
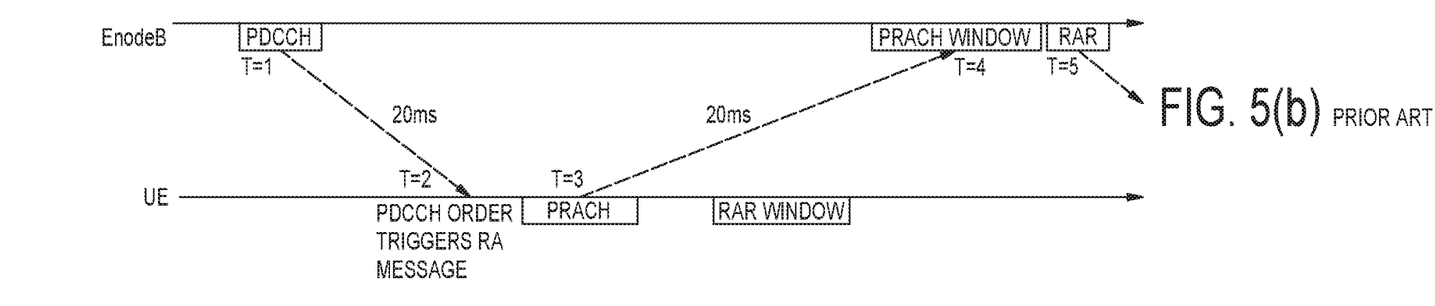
FIG. 5(b) shows normal handover procedure with added delay.
Figure 5C:
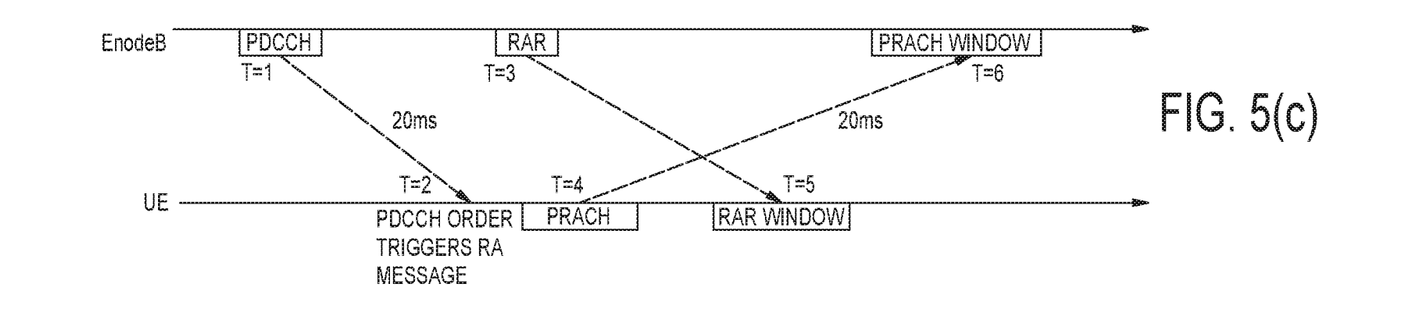
FIG. 5(c) shows handover procedure with added delay of the invention

Handover Procedure (FIG. 5)

The challenge of handover is similar to that of the Random Access Procedure, where a PRACH message is sent by the UE and a Random Access Response (RAR) is sent by the eNodeB. In a normal Random Access Procedure, the UE begins by transmitting a PRACH to the eNodeB. However, it is also possible for an eNodeB to force a UE to start a new Random Access Procedure. The eNodeB can do this by sending a Physical Downlink Control CHannel (PDCCH) order to the UE. This is a contention-free Random Access Procedure as the eNodeB instructs the UE to use a specific PRACH preamble identifier.

Referring to FIG. 5(a), in a normal handover with contention-free Random Access, the procedure is started by the eNodeB at T=1 using a PDCCH order which specifies a PRACH preamble identifier to be used by the UE. At T=2, the PDCCH order is received by the UE. At T=3, the UE transmits a PRACH to the eNodeB. This PRACH uses the preamble identifier specified in the PDCCH order. The PRACH is received by the eNodeB at T=4. At T=5, the eNodeB sends a Random Access Response (RAR) which is received by the UE at T=6.

As shown in FIG. 5(b), in the case of a large delay, the eNodeB sends a PDCCH order at T=1 which is received by the UE at T=2. The UE sends the PRACH at T=3 which may be received by the eNodeB at T=4. If the eNodeB receives the PRACH, it will respond with an RAR message. The process will fail due to the excessive delay. Either the PRACH will not arrive at the PRACH window and the eNodeB will fail to receive it or the RAR transmitted by the eNodeB will arrive much later than the RAR window at the UE and the UE will fail to receive it. This failure is similar to the case of the Random Access Procedure as described above.

FIG. 5(c) shows the Handover Procedure protocol according to one embodiment of the present invention. Here, contention-free handover with a preemptive RAR is employed. The eNodeB sends the PDCCH order at T=1 which specifies a PRACH preamble identifier to be used by the UE during the procedure. The eNodeB will then send a RAR message for that specific PRACH preamble identifier at T=3. The RAR message is sent before the PRACH message transmitted by the UE is actually received at T=6. In this way, the RAR message arrives at the UE at T=5 within the RAR window. The UE successfully receives the message and the procedure succeeds. Thus, the Handover Procedure protocol of the present invention will operate during excessive periods of delay in communication between the UE and the eNodeB, regardless of whether that delay occurs during the transmission from the UE to the eNodeB or during the transmission from the eNodeB to the UE. In addition, the protocol operates during normal conditions when there is no excessive periods of delay. And, this protocol is completely implemented at the eNodeB. The UE can operate as normal and no change is needed to the UE.

CONCLUSION

Thus, with respect to HARQ, the invention provides pre-acknowledgement so that connection is possible, but with possible loss of throughput. For the Random Access Procedure, the invention uses continuous RAR transmission so that connection is possible. For uplink time synchronization, Msg3 timing correction, UE timing adjustment using MAC CE or PDCCH order, so that connection is possible. For handover procedure, a modified random access procedure is provided using a contention-free approach.

The system and method of the present invention include operation by one or more processing devices or processing components, including at the eNodeB (including the scheduler) and/or at the UE. It is noted that the processing device can be any suitable device, such as a computer, server, processor, microprocessor, or the like. The device can communicate by wired or wireless connection to transmit and receive information, data, and/or commands. The information may be stored on a computer hard drive, on a CD ROM disk or on any other appropriate data storage device, which can be located at or in communication with the processing device. The entire process is conducted automatically by the processing device, and without any manual interaction. Accordingly, unless indicated otherwise the process can occur substantially in real-time without any delays or manual action.

The system and method of the present invention is implemented by computer software or software application that permits the accessing of data from an electronic information source. The software and the information may be within a single, free-standing processing device or it may be networked to a group of other processing devices or other electronic devices. And the software or software application can be stored on a medium that includes one or more non-transitory physical media that together store the contents. Embodiments may include non-volatile secondary storage, read-only memory (ROM), and/or random-access memory (RAM). And an application includes one or more computing modules, programs, processes, workloads, threads and/or a set of computing instructions executed by a computing system. Example embodiments of an application include software modules, software objects, software instances and/or other types of executable code.

Unless otherwise shown or stated, a connection and/or communication refers to one component being directly (wired or wirelessly) electrically connected to another component. Accordingly, the UE directly communicates with the eNodeB. However, the communication can be indirect, as may be suitable for certain applications.

Within this specification, the various communications and timing are approximate and exemplary to illustrate the scope of the invention and are not limiting. The timing can be approximate or substantially as defined, where the terms "substantially" and "about" mean plus or minus 15-20%, and in some embodiments plus or minus 10%, and in other embodiments plus or minus 5%, and plus or minus 1-2%. In addition, while specific dimensions, sizes and shapes may be provided in certain embodiments of the invention, those are simply to illustrate the scope of the invention and are not limiting. Thus, other dimensions, sizes and/or shapes can be utilized without departing from the spirit and scope of the invention.

The invention described herein can also be applied to other networks or systems, such as for example 5G NR networks. In the case of a 5G NR network, the base station is a gNodeB base station (often referred to simply as gNodeB) and the UE is a 5G NR mobile handset such as a cellular phone, smart phone or USB dongle.

It is further noted that in the figures and descriptions above, the various time periods are generically designed as T=1, 2, 3, etc. In those embodiments, the time periods do not indicate a specific quantity of time, and the time periods are consecutive, such that T=2 is an unspecified period of time after T=1, and T=3 is an unspecified period of time after T=2. It should be recognized, however, that those time periods can be for a specific period of time. And, that those time periods need not be consecutive. For example, in FIG. 3(c), it is possible that T=2 occurs before T=1, and that T=4 occurs before T=3. Consequently, the embodiments do not limit the invention.

The foregoing description and drawings should be considered as illustrative only of the principles of the invention. The invention may be configured in a variety of shapes and sizes and is not intended to be limited by the described embodiments. Numerous applications of the invention will readily occur to those skilled in the art. Therefore, it is not desired to limit the invention to the specific examples disclosed or the exact construction and operation shown and described. Rather, all suitable modifications and equivalents may be resorted to, falling within the scope of the invention.

The invention claimed is:

1. A base station for communication with a terminal station where the terminal station expects to receive an acknowledgement of communication within a fixed time period (X) to maintain a communication link with the base station, and a communication delay (Y) exists between the base station and the terminal station which is greater than the fixed time period (Y>X), said base station comprising:
 a processing device configured to schedule with the terminal station an expected time period at which the terminal station is expected to initially send data, provide the expected time period to the terminal station, and send a dummy acknowledgement signal of the data to the terminal station at a first time period that begins prior to the expected time period.

2. The base station of claim 1, said processing device further configured to determine the first time period based on a delay of communication between the base station and the terminal station.

3. The base station of claim 2, wherein said processing device determines the first time period based on the acknowledgement signal arriving at the terminal station at a predetermined point of time at which the terminal station expects to receive the acknowledgement signal.

4. The base station of claim 3, wherein said base station receives the data from the terminal station at a receipt time period after the predetermined point of time.

5. The base station of claim 4, wherein a time from the expected time period to the receipt time period is larger than expected due to a communication delay.

6. The base station of claim 5, wherein the base station comprises an eNodeB and the communication delay is greater than 40 ms.

7. The base station of claim 1, wherein a time from the first time period to the predetermined point of time is larger than expected due to a communication delay.

8. The base station of claim 1, wherein said base station implements a Hybrid Automatic Repeat reQuest (HARQ) retransmission and error correction protocol.

9. The base station of claim 1, wherein said base station avoids perceived transmission failure at the terminal station due to excessive channel delay.

10. The base station of claim 1, wherein said base station comprises an eNodeB and the terminal station is a user equipment.

11. The base station of claim 10, wherein the user equipment is a mobile device.

12. A base station for communication with a terminal station where the terminal station expects to receive an acknowledgement of communication within a fixed time period (X) to maintain a communication link with the base station, and a communication delay (Y) exists between the base station and the terminal station which is greater than the fixed time period (Y>X), said base station comprising:
 a processing device configured to schedule with the terminal station a first time period for the terminal station to transmit a Physical Random Access CHannel (PRACH) message, provide the first time period to the terminal station, send a Random Access Response (RAR) message to the terminal station at a second time period, establish an RAR window at the terminal station for receiving the RAR message during a third time period, and receive the PRACH message during a PRACH window during a fourth time period;
 wherein the second time period begins prior to the fourth time period.

13. The base station of claim 12, said processing device further configured to determine the second time period based on a delay of communication between the base station and the terminal station.

14. The base station of claim 13, wherein said processing device determines the second time period based on the RAR message arriving at the terminal station within the third time period at the terminal station during the RAR window.

15. The base station of claim 12, wherein said base station receives the PRACH message from the terminal station at the fourth time period during the PRACH window after the first time period.

16. The base station of claim 12, wherein a time from the first time period to the fourth time period is larger than expected due to a communication delay.

17. The base station of claim 16, wherein the base station comprises an eNodeB and the communication delay is greater than 40 ms.

18. The base station of claim 12, wherein said base station implements a Hybrid Automatic Repeat reQuest (HARQ) retransmission and error correction protocol.

19. The base station of claim 12, wherein said base station avoids perceived transmission failure at the terminal station due to excessive channel delay.

20. The base station of claim 12, wherein said base station comprises an eNodeB and the terminal station is a user equipment.

21. The base station of claim 20, wherein the user equipment is a mobile device.

22. The base station of claim 12, said processing device further configured to establish a fifth time period for the terminal station to transmit Msg3 transmissions.

23. The base station of claim 22, wherein the fifth time period is after the fourth time period.

24. The base station of claim 12, said processing device establishing a plurality of first time periods and the terminal station periodically transmits PRACH messages.

25. The base station of claim 12, said processing device further configured to generate a control element signal to adjust timing at the terminal station to transmit the PRACH message.

26. The base station of claim 12, said processing device transmitting a Physical Downlink Control CHannel (PDCCH) order to the terminal station.

27. The base station of claim 26, said processing device conducting a handover as the terminal device moves to/from a coverage area for said base station from/to another coverage area for another base station.

\* \* \* \* \*